United States Patent [19]
Pettitt

[11] Patent Number: 5,864,620
[45] Date of Patent: Jan. 26, 1999

[54] METHOD AND SYSTEM FOR CONTROLLING DISTRIBUTION OF SOFTWARE IN A MULTITIERED DISTRIBUTION CHAIN

[75] Inventor: John Philip Pettitt, Los Altos, Calif.

[73] Assignee: Cybersource Corporation, San Jose, Calif.

[21] Appl. No.: 638,949

[22] Filed: Apr. 24, 1996

[51] Int. Cl.⁶ ...................................................... H04L 9/00
[52] U.S. Cl. ..................... 380/4; 705/1; 380/25
[58] Field of Search ......................... 380/3, 4, 25; 705/1; 395/712

[56] References Cited

U.S. PATENT DOCUMENTS

| | | |
|---|---|---|
| 4,458,315 | 7/1984 | Uchenick . |
| 4,598,288 | 7/1986 | Yarbrough et al. . |
| 4,658,093 | 4/1987 | Hellman . |
| 4,677,434 | 6/1987 | Fascenda . |
| 4,683,553 | 7/1987 | Mollier . |
| 4,888,798 | 12/1989 | Earnest . |
| 4,924,378 | 5/1990 | Hershey et al. . |
| 4,937,863 | 6/1990 | Robert et al. . |
| 4,941,175 | 7/1990 | Enescu et al. . |
| 4,999,806 | 3/1991 | Chernow et al. . |
| 5,018,196 | 5/1991 | Takaragi et al. . |
| 5,023,907 | 6/1991 | Johnson et al. . |
| 5,103,476 | 4/1992 | Waite et al. . |
| 5,138,712 | 8/1992 | Corbin . |
| 5,204,897 | 4/1993 | Wyman . |
| 5,214,700 | 5/1993 | Pinkas et al. . |
| 5,222,134 | 6/1993 | Waite et al. . |
| 5,235,642 | 8/1993 | Wobber et al. . |
| 5,245,656 | 9/1993 | Loeb et al. . |
| 5,260,999 | 11/1993 | Wyman . |
| 5,261,002 | 11/1993 | Perlman et al. . |
| 5,267,314 | 11/1993 | Stambler . |
| 5,287,407 | 2/1994 | Holmes . |
| 5,337,357 | 8/1994 | Chou et al. . |
| 5,337,360 | 8/1994 | Fischer . |
| 5,343,529 | 8/1994 | Goldfine et al. . |
| 5,375,240 | 12/1994 | Grundy . |
| 5,390,297 | 2/1995 | Barber et al. . |
| 5,420,927 | 5/1995 | Micali . |
| 5,434,918 | 7/1995 | Kung et al. . |
| 5,438,508 | 8/1995 | Wyman . |
| 5,442,342 | 8/1995 | Kung . |
| 5,455,953 | 10/1995 | Russell . |
| 5,457,746 | 10/1995 | Dolphin . |

*Primary Examiner*—George Dombroske
*Assistant Examiner*—Paul D. Amrozowicz
*Attorney, Agent, or Firm*—Sawyer & Associates

[57] ABSTRACT

A system and method and system for controlling distribution of software to an user in a multitiered distribution chain. The system includes at least one entity that distributes the software in a locked software container, and includes means for receiving a request from the user to use the software. The method and system further includes a license clearing house for controlling usage rights of the software. The license clearing house includes means for receiving the request from the at least one entity, means for validating the request, means for generating a unique authentication certificate if the request was validated, and means for sending a reply to the user. The reply includes the authentication certificate and a master key, where the master key unlocks the software container and enables the user to use the software, and the authentication certificate identifies the user as an authorized user of the software.

9 Claims, 3 Drawing Sheets

METHOD AND SYSTEM FOR CONTROLLING DISTRIBUTION OF SOFTWARE IN A MULTITIERED DISTRIBUTION CHAIN

FIELD OF THE INVENTION

The present invention is a method and system for controlling distribution of software in a multitiered distribution chain, and more particularly to a method and system for distinguishing authorized users from unauthorized users.

BACKGROUND OF THE INVENTION

Software today is developed by authors who represent both large software companies and independent programmers. Both types of authors, however, are faced with problems associated with marketing their software, and with limiting the use of the software to only authorized users.

In a direct-marketing system, an author markets software directly to the user via a computer network, such as the internet for example. Typically, a large software company distributes demonstration copies of commercial software products and invites the user to test the software. If the user is satisfied, the user sends a payment to the company in return for the commercial version of the software. Independent programmers, in contrast, often distribute what is known as shareware, in which the user is allowed to test software that is typically a smaller, but fully functioning version of a commercial program. If the user is satisfied, the user is requested to pay the programmer a fraction of the cost of the commercial product in return for technical support and documentation.

Providing the user with demonstration software or providing the software without documentation prior to payment is an attempt by the author to restrict users who have not paid from using the software. To prevent unauthorized copying, the author could send the software to the users in encrypted form and require the user to send for a key in order to unlock the software. However, after the user has received the key and unlocked the software, the user may distribute the software to others, and the author has no way of knowing which users have been formally authorized.

Another problem is that no matter whether the author is a large company or an independent programmer, direct-marketing becomes too burdensome for the author as the number of user's continue to grow. Instead, it is more advantageous for the author to take advantage of traditional multitier distribution chains.

Multitier distribution chains typically include a distributor or reseller who sells copies of the software for the author. Examples of a distributor include mail-order houses and computer bulletin boards, for instance. Most often, the distributor provides the software to the user in a box that identifies the distributor. The buyer then sends payment to the author along with the identity of the distributor; and the author, in turn, pays a commission to the distributor. Optionally, the buyer pays the distributor, who then pays the author a royalty.

The problem with conventional multitier distribution chains is that the distributor must trust the author to pay the commissions, or the author must trust the distributor to pay the royalties. In either case, neither party has a mechanism to ensure payment. In addition, the distributor or the user may provide copies of the software to others. Even if the user is required to obtain a key, once the software is unlocked and distributed to other users, the author has no mechanism to distinguish authorized users from unauthorized users.

Accordingly, what is needed is an improved system and method for controlling distribution of software in a multitiered distribution chain that enables the author to distinguish between authorized and unauthorized users. The present invention addresses such a need.

SUMMARY OF THE INVENTION

The present invention provides a method and system for controlling distribution of software to an user in a multitiered distribution chain. The system includes at least one entity that distributes the software in a locked software container. The distribution includes means for receiving a request from the user to use the software. The method and system further includes a license clearing house for controlling usage rights of the software. The license clearing house includes means for receiving the request from the at least one entity, means for validating the request, means for generating a unique authentication certificate if the request was validated, and means for sending a reply to the user. The reply includes the authentication certificate and a master key, where the master key unlocks the software container and enables the user to use the software, and the authentication certificate identifies the user as an authorized user of the software.

According to the system and method disclosed herein, the only trusted entity in the distribution chain is the license clearing house, all other entities including the author of the software are incapable of generating authorization certificates.

DESCRIPTION OF THE INVENTION

The present invention relates to an improvement in distributing software in a multitier distribution network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
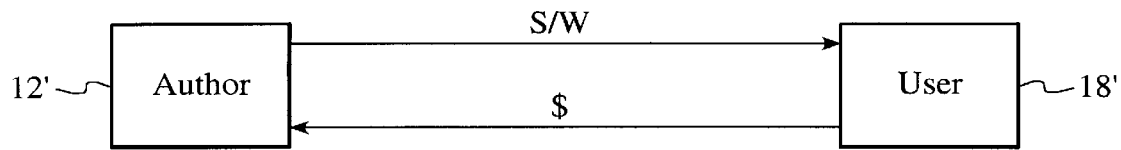
FIG. 1A and 1B are block diagrams illustrating conventional software distribution methods.

FIG. 1A is block diagram illustrating a conventional direct-marketing system for distributing software in which an author 12' of a software program widely distributes the software directly to a user 18' via computer networks, for example. The author 12' may be a large software company who is distributing demonstration programs for the user 18' to try, or the author may be an independent programmer who is distributing shareware. As shown, if the user 18' is satisfied with the product, the user 18' sends some form of payment directly to the author 12'. Besides problems with controlling unauthorized use of the program after the sale, the direct-marketing system is incapable of supporting a traditional multitier distribution chain.

Figure 1B:
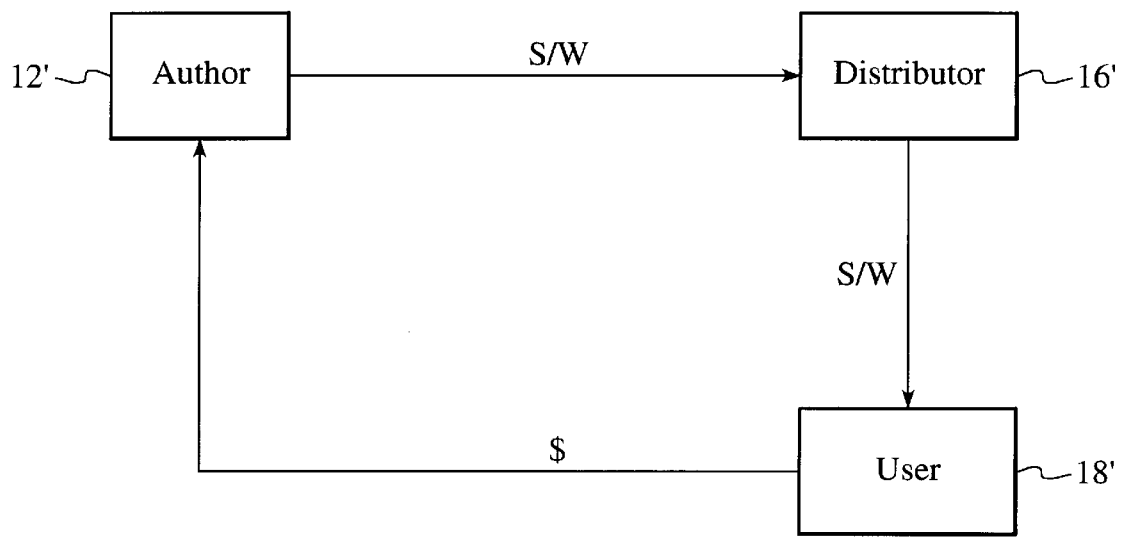

FIG. 1B is block diagram illustrating a conventional multitier software distribution chain in which an author 12' provides software to one or more distributors 16', who then sell the software to the user 18'. In this system, the user 18' pays the author 12', who in turn, pays a commission to the distributor 16', or the user 18' pays the distributor 16' for the software, and the distributor 16' then pays the author 12' a royalty.

In either case, neither the distributor 16' or the author 12' can ensure payment from the other party. Each party is forced to trust the other. In addition, the distributor 16' or the user 18' may provide unauthorized copies of the software to others. Even if the user 18' is required to obtain a key, once the software is unlocked, the author 12' has no mechanism to distinguish authorized users from unauthorized users.

The present invention is a method and system for distributing software in a multitiered distribution chain that enables an author to distinguish authorized users from unauthorized users. To more particularly illustrate the method and system in accordance with the present invention, refer now to FIG. 2 depicting a block diagram of one embodiment of such a system.

Figure 2:
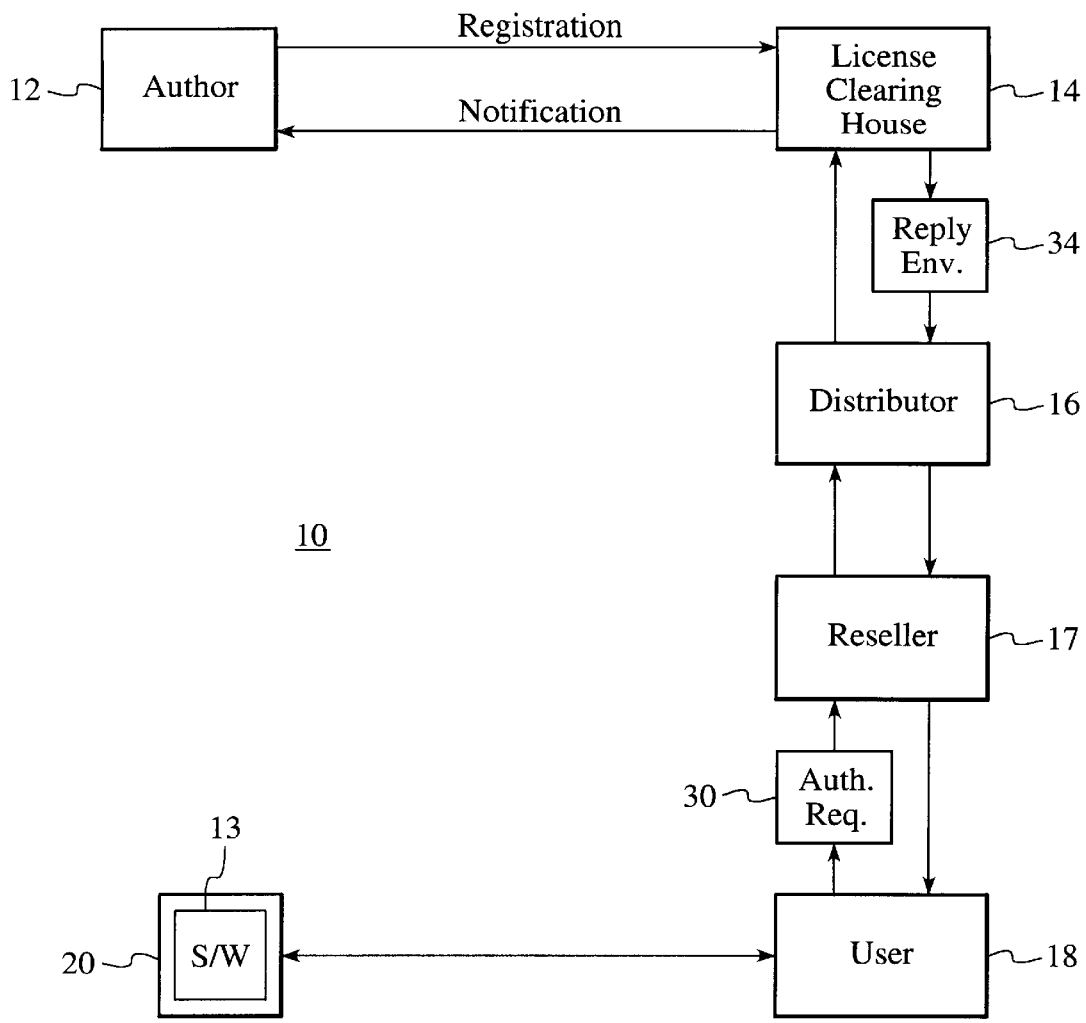
FIG. 2 is a block diagram of a multitier software distribution method and system in accordance with the present invention.

FIG. 2 is block diagram of the multitiered software distribution system 10 of the present invention. The system 10 includes an author 12 who has developed software 13, and one or more distributors 16, one or more optional resellers 17, and an end user 18. In accordance with the present invention, the multitiered software distribution system 10 also includes a license clearing house (LCH) 14, which ensures the integrity and controls the usage rights of the software 13.

Figure 3:
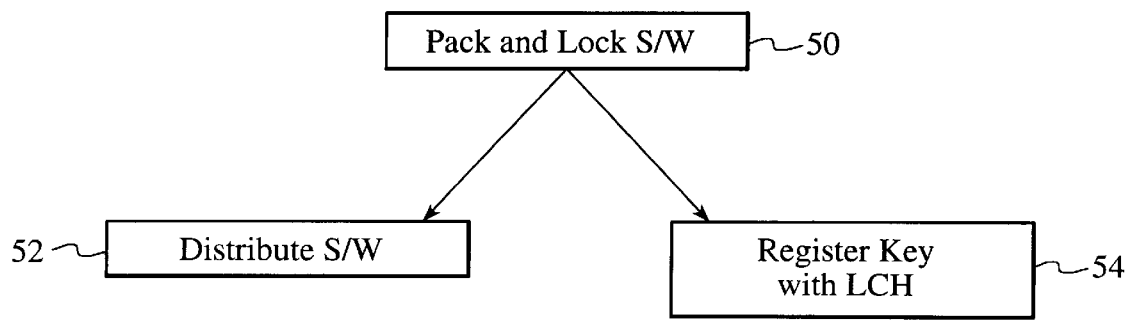
FIG. 3 is a flow chart illustrating the interaction between an author and the license clearing house of the present invention.

Referring to FIG. 3, a flow chart of the interaction between the author 12 and the LCH 14 is shown. After the author 12 has developed software 13 that s/he wants to market, the author 12 packs the software 13 in a digital shipping container 20 shown in FIG. 2, and locks the container 20 through encryption in step 50. For purposes of this specification, the term digital shipping container 20 means an encrypted data object in which the software 13 is stored that can be opened only by a validated key. As will be appreciated by those with ordinary skill in the art, many types of encryption schemes may be used, such as DES, for example.

After the software 13 has been encrypted, the author 12 distributes the software 13 for public availability in step 52. In a preferred embodiment, copies of the encrypted software 13 are provided to the distributor 16, who then provides them to the reseller 17 for public sale. Copies of the encrypted software 13 may also be provided directly to the user via computer networks, such as the Internet, or via cable TV.

After the software 13 has been made publicly available, the author 12 registers the identity of each container 20 with the LCH 14 in step 54 by identifying the key or keys used to encrypt the containers 20. The author 12 also registers the identities of those distributor(s) 16 and reseller(s) 17 that the author 12 has chosen to distribute the software 13. The author 12 may either encrypt each copy of the distributed software 13 with a single master key and deposit the master key with the LCH 14, or the master key may be encrypted with a second key, and the second key deposited with the LCH 14.

In a preferred embodiment, the public encryption keys of the distributor 16 and reseller 17 are also registered with the LCH 14. To ensure authentication, the LCH 14 may obtain public key certificates for the distributor 16 and reseller 17 from an external authority (not shown).

Figure 4:
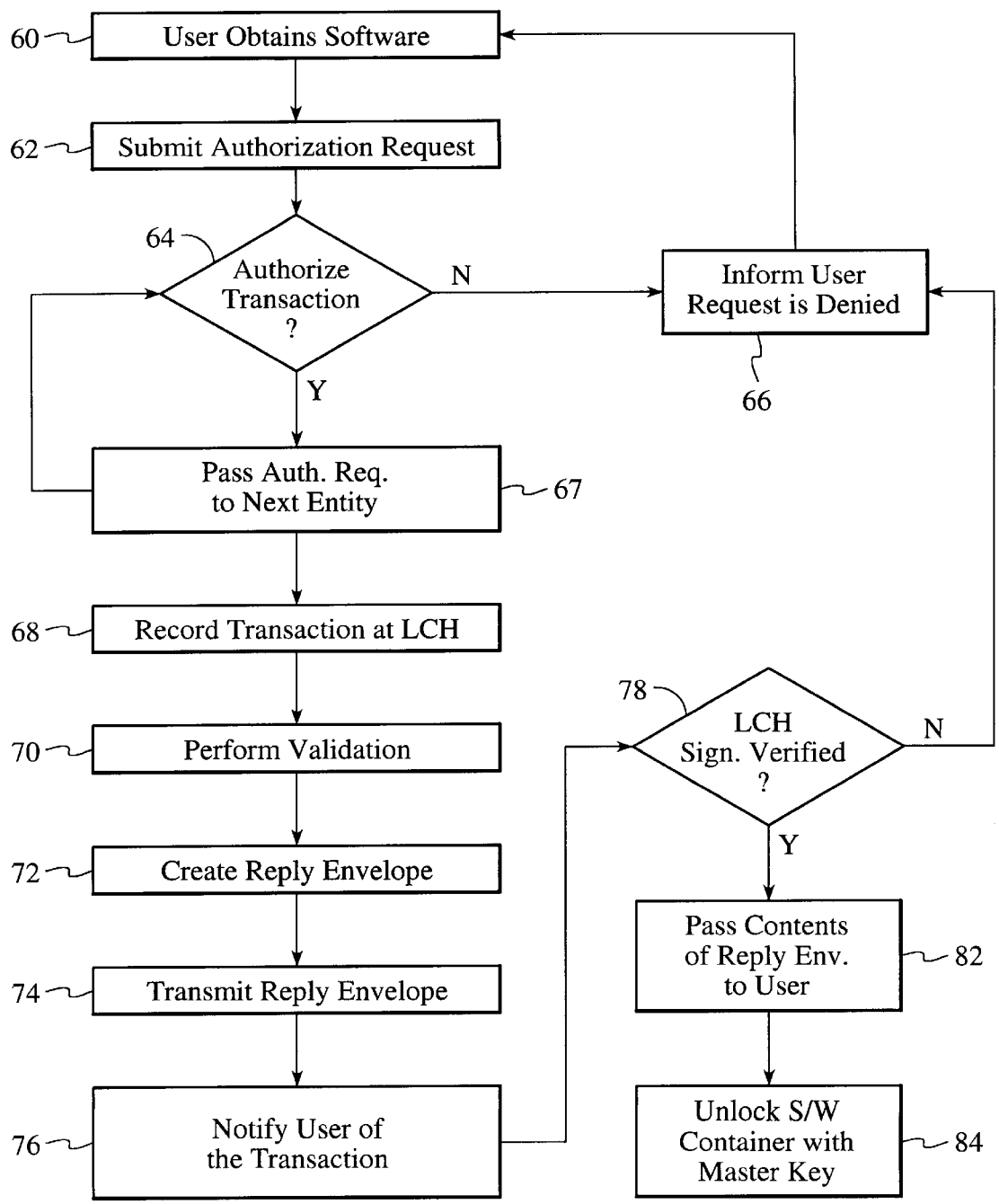
FIG. 4 is a flow chart of the steps performed by multitier software distribution system in response to an authorization request by a user.

FIG. 4 is a flow chart depicting the steps performed by multitier software distribution system 10 in response to an authorization request by the user 18. Referring to both FIGS. 2 and 4, the process begins once the user 18 obtains a copy of the digital software container 20 in step 60. In order to purchase or license the software 13 and to unlock the container 20, the user 18 must first submit an authorization request 30 to the reseller 17 in step 62. In a preferred embodiment, the request includes:

1. information identifying the software,
2. information identifying the user,
3. some form of payment (e.g. a credit card number), and
4. a digital signature of the user.

Upon receiving the request 30, the reseller 17 performs a payment validation and optionally authorizes the transaction in step 64. If the reseller 17 denies the transaction, then the user 18 is notified in step 66. If the transaction is accepted, then the reseller 17 passes the user's authorization request 30 to the distributor 16 in step 66.

The reseller 17 ensures the integrity of the information by placing the user's authorization request 30 inside a digital envelope through encryption, and by digitally signing the envelope with the reseller's signature. The reseller 17 also assigns a transaction identification number to the envelope before transmitting the envelope to the distributor 18.

Since the multitier distribution system 10 may include many levels, steps 64 and 67 are repeated by each entity in the distribution chain until the envelope is transmitted to the LCH. For example, step 64 is repeated when the distributor 16 receives the envelope from the reseller 17 and performs a payment validation, this time for the reseller, and optionally authorizes the transaction. Step 67 is repeated when the distributor 16 places the reseller's envelope into a distributor envelope, and digitally signs the envelope with the distributor's signature before transmitting the distributor envelope to the LCH.

Assuming the multitier distribution system 10 contained only the two levels shown in FIG. 2, then the envelope reaching the LCH 14 would include:

1. the transaction identification number,
2. information identifying the software,
3. information identifying the user,
4. the digital signature of the reseller, and
5. the digital signature of the distributor.

After receiving the envelope, the LCH 14 records the transaction in step 68, and performs a validation in step 70. The result of the validation is a result code that indicates whether or not the LCH 14 authorizes the transaction. The LCH 14 validates the transaction by comparing the digital signatures of the distributor 16 and reseller 17 with their registered public keys. If the digital signatures do not match the registered public keys, then the result code indicates that LCH 14 denies the transaction. If the digital signatures do match the registered public keys, then the result code indicates that LCH 14 authorizes the transaction.

After generating the result code, the LCH 14 creates a reply envelope 34 through encryption in step 72. The reply envelope 34 includes:

1. information identifying the software,
2. information identifying the user, 3. the digital signature of the reseller,
4. the digital signature of the distributor,
5. a master key that unlocks the software container 20 (if the transaction has been authorized), and
6. a digital authorization certificate.

The digital authorization certificate is generated by hashing the above-identified information and encrypting it with the LCH's a private key.

Since the distributor 16 and reseller 17 need to know whether the transaction was authorized, the LCH 14 transmits the reply envelope 34 to the user 18 back through the distribution chain in step 74, rather than transmitting the reply envelope 34 directly to the user 18.

In a preferred embodiment of the present invention, the envelope 34 is created by encrypting the contents of the reply envelope 34 with the reseller's public key. Because only the reseller 17 can decrypt the envelope, the identity of the user 18 is protected from entities in the chain other than the reseller. This also prevents these entities from decrypting the envelope 34 and gaining access to the master key.

The LCH 14 also digitally signs the envelope with the signature of LCH 14 by hashing the contents of the reply envelope and encrypting the result of the hash with the LCH's private key. In order to enable the entities in the chain other than the reseller 17 to record the transaction before passing the envelope to the next entity, the transaction I.D. and the result code are also placed on the outside of the reply envelope 34 in unencrypted form.

After the LCH 14 transmits the reply envelope 34, the LCH 14 notifies the author 12 of the transaction in step 76 if the transaction was authorized by the LCH 14. In a preferred embodiment, the LCH 14 also pays the author 12 his or her royalty for the transaction by debiting a distributor 16 account and transferring the amount to an author 12 account. This way, the author 12 is ensured payment for each copy of the software 13 sold.

As the reply envelope 34 is passed down from one entity to the next in the chain, each entity verifies the LCH 14 signature on the return envelope 34 in step 78 to check for authenticity. This is accomplished by hashing the contents of the reply envelope 34, decrypting the LCH 14 signature with the LCH's public key and comparing the result of hash with the decrypted LCH 14 signature. If there is a match, then the LCH 14 signature is authenticated.

Once the reply envelope 34 is received by the reseller, the reseller 17 verifies the LCH 14 signature, as described above, in step 78 and examines the result code. If the LCH 14 signature is not authenticated or the result code indicates that the LCH 14 did not authorize the transaction, then the reseller 17 informs the user 18 that the request was denied in step 66. If the LCH 14 signature is authenticated and the result code indicates that the LCH 14 has authorized transaction, then the reseller 17 decrypts the reply envelope 34 using the reseller's public key, and passes the contents onto the user 18 in step 82.

The user 18 then uses the authorization certificate and the master key to unlock the software container 20 and install the software in step 84. Since the authorization certificate passed down from the LCH 14 will be different for each user 18 because the certificate was derived from the user's information, the possession of the authorization certificate is the user's proof of purchase, and proof that s/he is an authorized user.

The present invention is not intended to stop illegal copying of the software once it is unlocked. The present invention does, however, provide the author 12 with a mechanism to distinguish authorized users from unauthorized users. To determine whether a particular user 18 is authorized, the author 12 may request the original authorization certificate from the user 18. If the user 18 cannot provide it, then the user 18 has no proof that s/he is an authorized user.

If the user 18 provides the author 12 with an original authorization certificate, then the author 12 takes the identity of the user 18 and derives a new authorization certificate. This new authorization certificate is then compared to the original authorization certificate. If the new authorization certificate does not match the original authorization certificate, then the author 12 may conclude that the person is an unauthorized user.

According to the multitier distribution system 10 of the present invention, the only trusted entity in the distribution chain is the LCH 14, all other entities including the author 12 are incapable of generating authorization certificates. Further, the use of the LCH 14 signature on the reply envelope 34 ensures that the envelope contents including the master key and authentication certificate, has not been tampered (integrity) with.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for controlling distribution of software to a user in a multitiered distribution chain, the system comprising:

at least one entity that distributes the software in a locked software container, the at least one entity including means for receiving a request from the user to use the software; and a license clearing house coupled to the entity for controlling usage rights of the software, the license clearing house including,
means for receiving the request from the at least one entity,
means for validating the request,
means for generating a unique authentication certificate if the request was validated, and
means for sending a reply to the user, the reply including the authentication certificate and a master key, the master key for unlocking the software container and enabling the user to use the software, and the authentication certificate for identifying the user as an authorized user of the software.

2. A system as in claim 1 wherein the license clearing house further includes means for signing the reply with a digital signature of the license clearing house.

3. A system as in claim 2 wherein the at least one entity further includes:

means for authorizing user transactions;
means responsive to the authorizing means for signing the authorization request with a digital signature of the entity;
means for receiving the reply from the license clearing house;
means for verifying the digital signature of the license clearing house;
means for passing the master key and the authentication certificate from the reply to the user.

4. A system as in claim 3 further including:

an author for developing and placing the software in the software container using the master key, the author registering the master key and the identity of the at least one entity with the license clearing house.

5. A system as in claim 4 wherein the license clearing house further includes means for placing a transaction number and result code on the reply, and wherein the at least one entity further includes means for recording the transaction using the transaction number and result code.

6. A method for controlling distribution of software in a multitiered distribution chain, the multitiered distribution chain including at least one entity who distributes the software, the method comprising the steps of:

(a) distributing encrypted software;

(b) registering the encrypted software and the identity of the at least one entity with a license clearing house;

(c) providing a user with the encrypted software;

(d) receiving an authorization request by the at least one entity from the user;

(e) signing the authorization request with a signature of the entity.

(f) passing the authorization request to the license clearing house;

(g) validating the signature of the at least one entity and the authorization request by the license clearing house;

(h) signing a master key with a signature of the license clearing house;

(i) transmitting the signature of the license clearing house and the master key to the at least one entity;

(j) validating the signature of the license clearing house and passing the master key from the at least one entity to the user; and (k) using the master key to decrypt the software.

7. A method as in claim 6 wherein step (g) further includes the step of:

(g2) generating an authentication certificate from information regarding the user if the authorization request was validated by the license clearing house.

8. A method as in claim 7 wherein step (i) further includes the step of:

(i1) transmitting the authentication certificate to the at least one entity along with the master key.

9. A method as in claim 8 wherein step (j) further includes the step of:

(j1) passing the authentication certificate to the user along with the master key, whereby the authentication certificate identifies the user as an authorized user of the software.

* * * * *